INVENTORS
A. DELT CLARK
F. DELT CLARK

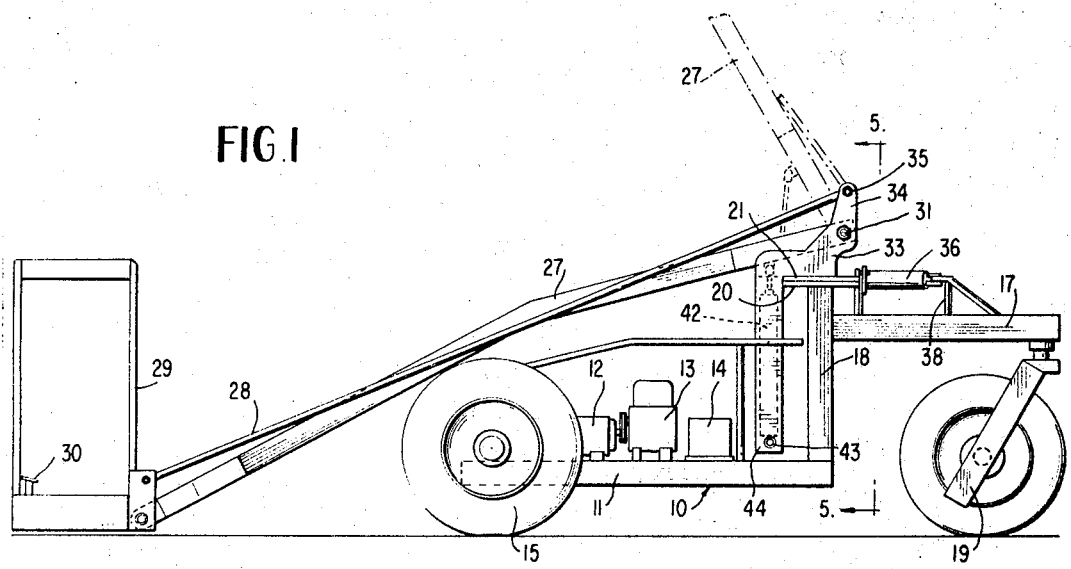
FIG. I
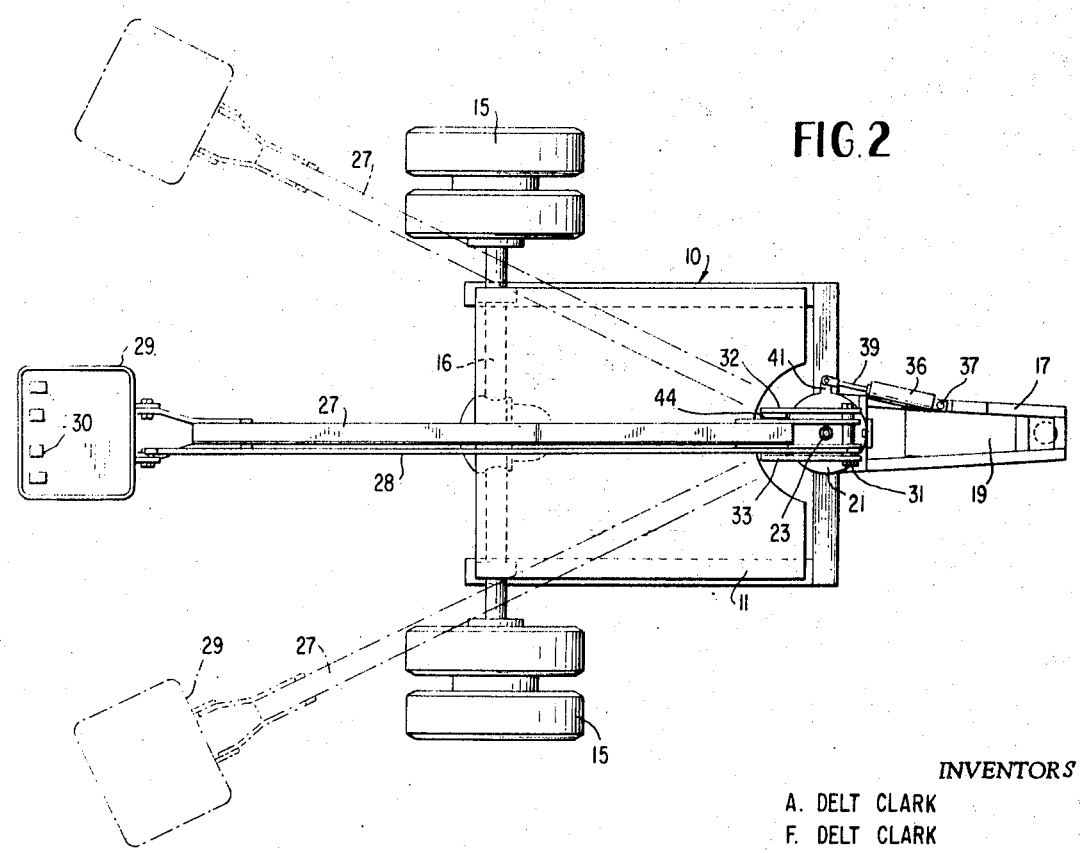
FIG. 2
INVENTORS
A. DELT CLARK
F. DELT CLARK
BY  B.P. Fishburn, Jr.
ATTORNEY

BY

ATTORNEY

United States Patent Office 3,448,827
Patented June 10, 1969

3,448,827
MOBILE WORKER SUPPORT
Arthur Delt Clark and Francis Delt Clark, both of
Rte. 2, Wapato, Wash. 98951
Filed Aug. 16, 1967, Ser. No. 661,008
Int. Cl. E04g *3/16*
U.S. Cl. 182—14            12 Claims

ABSTRACT OF THE DISCLOSURE

A highly maneuverable, safe and economical machine which is capable of elevating a worker to considerable heights and moving him from side-to-side for substantial distances without the necessity for moving the entire machine as when working in the orchard or the like. The worker may also be lowered close to the ground. The machine controls are all located upon the worker's cage so that the machine can be totally controlled by a single operator.

Background of the invention

There has long been a need for a well-balanced simplified and highly maneuverable worker support or platform for use in orchard pruning, thinning and picking, and for other uses, such as building maintenance, repair and the like, where the workman must be elevated and also moved laterally. Most prior art devices capable of such usage have been unduly complicated, heavy, costly and not sufficiently maneuverable for orchard work and the like.

One prior art patent, namely, U.S. Patent 2,954,092, issued Sept. 27, 1960 to Thornton-Trump, closely approaches a solution to the problem through the provision of a simplified three wheeled power operated maneuverable machine having a boom supported elevatable and swingable worker platform. However, there is a serious deficiency inherent in the construction of the Thornton-Trump machine which tends to render the machine top heavy, thus limiting its use on a hillside or rough terrain. This deficiency resides in the fact that the platform carrying boom is mounted to the top end of a rather high vertical mass structure which extends above the main frame of the machine. This elevates the center of gravity and when the worker support is swung laterally, there is some tendency for top heaviness and tilting.

This defect of the prior art is completely cured by the present invention through the provision of a generally similar machine having a much lower mounting for the boom structure, thus materially lessening the tendency for lateral tilting and materially increasing the utility of the machine, particularly on unlevel ground. Additionally, the construction of the machine has been simplified and rendered considerably more compact and economical in comparison to the prior art.

Summary of the invention

In accordance with the invention, in orchard or like machine is provided having a self-propelled three wheeled chassis including a full castering front wheel and hydraulically powered rear driving and steering wheels. There is a relatively low elevation power operated turntable mounting for a boom which carries the worker cage or platform. All machine controls are located on the worker cage near the feet of the operator so that a single operator or workman can easily control the machine while having his hands and arms free for pruning, picking or like operations.

Brief description of the drawings

FIGURE 1 is a side elevational view of a mobile worker support embodying the invention;
FIGURE 2 is a plan view thereof.

Description of the preferred embodiment

Figure 3:
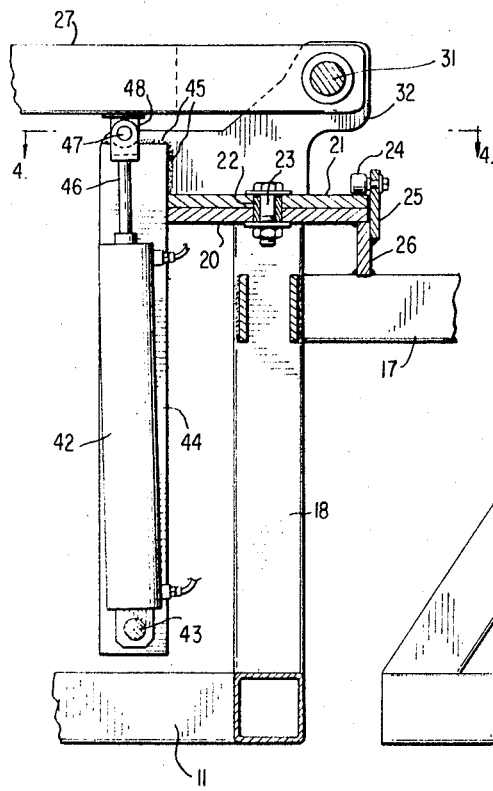
FIGURE 3 is an enlarged fragmentary vertical section through the turntable structure of the machine, with parts omitted and parts in elevation.

Referring to the drawings wherein like numerals designate like parts throughout the same, the machine comprises a three wheeled chassis 10 including a low horizontal main frame portion 11 upon which the power components of the machine are mounted including a suitable electrical generator 12, internal combustion engine 13 and hydraulic oil reservoir 14. These elements are conventional and need not be described in detail. The rear of the machine is supported by widely spaced traction and steering wheels 15 having an axle housing 16 suitably connected to the frame portion 11 and supporting the latter. The wheels 15 are preferably powered or driven by conventional hydraulic means, not shown, operated by the engine 13, which also drives the generator 12. Other forms of powering the wheels 15 may be employed, if desired.

Figure 5:
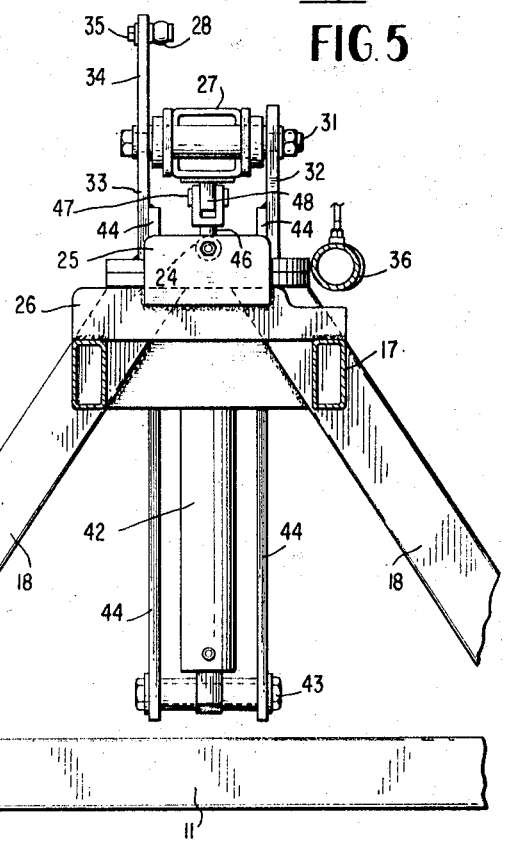
FIGURE 5 is a transverse vertical section taken substantially on line 5—5 of FIGURE 1.
Figure 4:
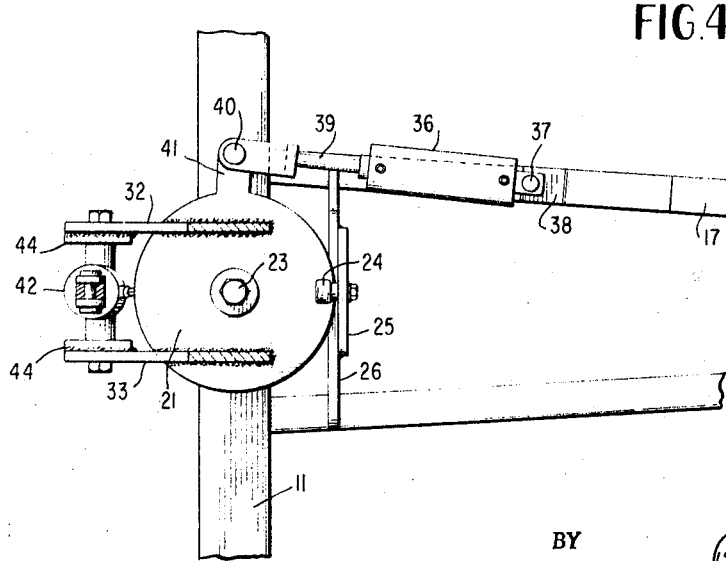
FIGURE 4 is a fragmentary horizontal section taken on line 4—4 of FIGURE 3.

The chassis also has a forward somewhat elevated horizontal frame extension 17 rigidly connected with the frame portion 11 by vertical members 18 which converge upwardly as shown in FIGURE 5. The main frame of the machine is preferably of welded construction and is quite sturdy without being excessively heavy. The front of frame extension 17 is supported by a full 360 degree castering wheel 19 which responds to steering movements produced by the wheels 15.

Mounted immediately on top of the vertical members 18 is a boom turntable structure which constitutes a very important feature of the invention. This turntable structure comprises a relatively stationary flat turntable base plate 20 secured rigidly to the tops of members 18 and being horizontal. A rotating flat turntable plate 21 is disposed slidably upon the base plate 20 and both plates have a central opening receiving a suitable bushing 22 and pivot bolt or axle 23, FIGURE 3. The turntable plate 21 is stabized by a hold-down roller 24 carried by a plate 25 which may be welded to another plate section 26, in turn welded to the frame portion 17 and to the relatively stationary base plate 20, FIGURES 3 and 5. The plate 21 is thus mounted for rotation in a horizontal plane and about a vertical axis upon the base plate 20 and very close to the top of the vehicle main frame, thus providing the machine with a very low center of gravity.

Mounted directly upon the turntable plate 21 for turning movement therewith is a boom structure including a main boom arm or member 27 and conventional equalizer link 28. The rear end of the boom arm 27 supports a single worker's cage 29 which remains level in all positions of elevation of the boom arm and is bodily carried by the same. All of the controls for driving and steering the chassis 10 and for raising and lowering the worker cage 29 and swinging the same from side-to-side are located on the worker cage, preferably near the feet of the operator, as shown diagrammatically at 30. These controls per se are conventional and known in the art and need not be described herein. The controls on the cage 29 include forward and reverse movement controls for the chassis, steering and brake controls and controls for the up and down and lateral swinging movements of the boom arm. If preferred, the drive and control means for the machine may be substantially as disclosed in the above-mentioned Patent 2,954,092.

As shown in the drawings, the forward end of the boom arm 27 is pivoted to a transverse horizontal axis pivot shaft 31 held in a pair of laterally spaced upstanding brackets 32 and 33 rigidly secured by welding to the turntable plate 21. The pivot shaft 31 is thus spaced only a slight distance above the turntable structure and the boom arm is mounted at a considerably lower elevation than in said mentioned prior patent. This feature of construction is very important in that it lowers the center of gravity of the machine and renders the machine much more stable, thus increasing its range of utility on rough terrain and the like. The bracket 33 includes a short upright extension 34 integral therewith to which the forward end of the equalizer link 28 is pivoted as at 35.

The turntable plate 21 and the boom thereon are turned in a horizontal plane in the following manner. A horizontal extensible and retractable cylinder-piston unit 36 has its forward end pivotally secured as at 37 to a supporting means 38 on the frame extension 17. The piston rod 39 has its rear end pivotally secured at 40 to a radial extension 41 on turntable plate 21. Extension and retraction of the piston rod 39 under control of the worker on the cage 29 causes the boom arm 27 to swing horizontally in either direction from center through the approximate range of movement shown in broken lines in FIGURE 2.

In order to raise and lower the boom arm 27 and cage 29 by swinging the same vertically on the pivot shaft 31, a substantially vertically disposed extensible and retractable hydraulic cylinder-piston unit 42 has its lower end pivotally mounted at 43 to the lower ends of a pair of spaced vertical sturdy bracket extensions 44 whose upper ends are rigidly secured by welding as at 45, FIGURE 3, to the boom supporting brackets 32 and 33. The piston rod 46 of the unit 42 is pivotally connected at 47 to a lug 48 on the boom arm 27 near and rearwardly of the pivot shaft 31. Extension and retraction of the unit 42 under control of the worker on the cage 29 will raise and lower the boom through the approximate limits shown in full lines and broken lines in FIGURE 1.

It may be observed that the arrangement of the extensible and retractable unit 42 immediately rearwardly of the vertical frame portion 18 and turntable in depending relation from the brackets 32 and 33 renders the construction highly compact and concentrates weight below the turntable for lowering the center of gravity of the machine. This is an important feature of the invention which constitutes a distinct improvement over the prior art as embodied in the mentioned prior patent.

In light of the above description, the overall operation of the machine requires little explanation. The single worker on the cage 29 by using the foot controls 30 may propel the machine forwardly and rearwardly and may steer and brake the machine. He may also raise and lower the cage 29 from a position at ground level, as shown in FIGURE 1, to a position at tree top height in an orchard. Additionally, the worker by using the foot controls may effect swinging of the cage and boom from side-to-side, as explained. The machine is highly maneuverable and can move the worker over a rather wide range without moving the entire machine. Due to the improved lower center of gravity, there is less tendency for the machine to tilt under load and the machine may be used with safety on a hillside or the like.

The advantages of the construction will be apparent to those skilled in the art, without the necessity for any further description herein.

It is to be understood that the form of the invention herewith shown and described is to be taken as a preferred example of the same, and that various changes in the shape, size and arrangement of parts may be resorted to, without departing from the spirit of the invention or scope of the subjoined claims.

We claim:

1. A mobile worker support comprising a self-propelled chassis, a turntable structure mounted on said chassis near the elevation of the top of the chassis and having a vertical axis of rotation, bracket means on a revolving part of the turntable structure and including a depending extension projecting substantially below the elevation of the top of the chassis and turntable strucure, a boom pivoted to the bracket means and bodily carried thereby, a worker cage on the boom, a first actuator on the chassis having a connection with the revolving part of the turntable structure and operable to turn the revolving part in opposite directions, and a second actuator secured to the depending extension of the bracket means and having a connection with said boom and operable to raise and lower the boom.

2. A mobile worker support according to claim 1, and wherein said chassis includes a frame having a low portion and a raised portion and a connecting upright portion, said turntable structure mounted on the top of the upright portion, said first actuator lying near and above the raised frame portion, and the second actuator and said depending extension disposed near one side of the upright frame portion.

3. A mobile worker support according to claim 2, and wherein first and second actuators each comprise an extensible and retractable cylinder-piston unit, and control means for said actuators on the worker cage.

4. A mobile worker support according to claim 1, and wherein said turntable structure comprises a base plate secured fixedly on said chassis, a rotatable turntable plate mounted upon the base plate, a center pivot element extending through said base and turntable plates, and a hold-down element engaging the top of the turntable plate and tending to prevent upward displacement thereof.

5. A mobile worker support according to claim 4, and wherein said hold-down element is a roller engaging the turntable plate near the periphery thereof.

6. A mobile worker support according to claim 4, and wherein said turntable plate includes a radial extension, and said first actuator connected with said radial extension.

7. A mobile worker support according to claim 1, and power means mounted on said chassis including means to drive the chassis, and control means on the worker cage to enable the operator thereon to control said power means and first and second actuators.

8. A mobile worker support according to claim 7, wherein the control means are foot-operated control means adjacent the bottom of said cage.

9. A mobile worker support according to claim 1, and wherein said chassis comprises a frame, a front caster wheel on said frame, and a pair of laterally spaced driving and steering wheels on the rear end of said frame.

10. A mobile worker support comprising a main frame having a low ground clearance section, a forward elevated section and an intermediate substantially upright section interconnecting said low ground clearance and elevated frame sections, a front caster wheel mounted beneath and supporting the elevated frame section, spaced rear traction wheels supporting said low ground clearance section, a substantially vertical axis turntable structure on the top of the intermediate frame section near the elevation of the forward elevated frame section, a first power means connected with the turntable structure to turn it on its rotational axis in a substantially horizontal plane, a boom pivoted to the turntable structure and adapted to be raised and lowered with a vertical swinging movement, a depending extension on the turntable structure extending substantially therebelow to a point near the elevation of the low ground clearance frame section, a second power means connected with the boom to raise and lower it and extending below the turntable structure and having a connection near its lower end with the lower end portion of said depending extension, and said second power means bodily carried by the turntable structure and revolving therewith around the axis of the turntable structure.

11. A mobile worker support according to claim 10, and wherein the turntable structure comprises a base plate and a rotary plate slidably mounted upon the base plate, said first-named power means having a connection with the rotary plate and a connection with said main frame.

12. A mobile worker support according to claim 11, and wherein the first-named and second power means are independently operable extensible and retractable cylinder-piston units.

References Cited

UNITED STATES PATENTS

| | | | |
|---|---|---|---|
| 2,954,092 | 9/1960 | Trump | 182—2 |
| 3,156,313 | 11/1964 | Peterson | 182—2 |
| 3,224,528 | 12/1965 | Hubbard | 182—2 |
| 3,319,739 | 5/1967 | Morse | 182—2 |
| 3,379,279 | 4/1968 | Slusher | 182—2 |

REINALDO P. MACHADO, *Primary Examiner.*

U.S. Cl. X.R.

182—2, 16